Patented May 28, 1946

UNITED STATES PATENT OFFICE 2,400,918

2,400,918

AIRPLANE WING OR FIN WITH IMPROVED AIRFOIL CHARACTERISTICS

Vaile A. Cosler, Wilmington, Del., assignor to E. I. du Pont de Nemours & Company, Wilmington, Del., a corporation of Delaware No Drawing. Application April 8, 1942, Serial No. 438,144

2 Claims. (Cl. 154—41)

This invention relates to a process for finishing airplane wings and fins and more particularly to those with improved airfoil surfaces.

In the construction of metal airplane wings and fins, customary procedure provides for the riveting of wing sections to supporting structures. In order to reduce turbulence in the air flow passing over the wing surface when the plane is in motion as caused by the protruding rivet heads, the rivets are countersunk or laboriously filed off to produce a smoother surface. Other surface irregularities also contribute to lower efficiency of the airfoil with resultant loss in speed and lift. It has been estimated that if a perfectly smooth wing surface could be made available, the speed of a plane which normally may be operated at about 400 miles per hour could be increased as much as 40 miles per hour at maximum power output. Important fuel-saving represents an additional factor in approaching the objective of devising a means for obtaining a uniformly smooth wing surface. Numerous methods for accomplishing the desired result, such as conventional coating systems, have been proposed but have been discarded because of failure to provide a uniformly smooth surface or because of excessive shrinkage, prohibitory weight increase or lack of sufficient elasticity for normally encountered wing deformation.

The primary object of the invention therefore is the provision of a means for obtaining a uniformly smooth surface on airplane wing and fin structures.

Another object is the provision of an airplane wing or fin which greatly improves the performance of the aircraft unit of which the new wing or fin forms a part.

Another object is the provision of a method for reducing or eliminating turbulence in the air flow over an airplane wing and fin surface as caused by rivet heads or other protuberances or irregularities in the wing or fin surface, which is simple and practical in its operation.

A further object is the provision of a means for obtaining a uniformly smooth wing and fin surface which keeps added weight at a minimum. Other objects will appear as the description of the invention proceeds.

These objects are accomplished by the application to an airplane wing or fin section of a potentially reactive organic polymer composition preferably comprising rubber or a synthetic rubber polymer adapted to form a porous, sponge-like structure and thereafter placing the coated unit in a suitable mold and heating until the composition has assumed a sponge-like structure and has become vulcanized or converted to a substantially inert state.

In practicing the invention in its preferred embodiment, the wing or fin surface is coated with an adhesive adapted to adhere a subsequently applied rubber or synthetic rubber polymer composition and allowed to dry. A rubber or synthetic rubber polymer composition containing potentially gas-evolving chemical reactants is calendered onto a fabric which may, if desired, also be presized with an adhesive of the above-mentioned type. This composition is then placed on the adhesive-coated metal surface of the wing or fin with only moderate pressure which may be done manually with the fabric foundation exposed. The unit is then placed in a conforming mold, preferably of light weight metal, which is oversize to permit expansion of the modified rubber or equivalent polymer with the formation of a spongy structure upon heating. The temperature of the composition is raised by any suitable means whereupon the gas-evolving chemical reactants incorporated in the rubber or equivalent polymer are caused to give off a gas which imparts a porous structure to the composition and at the same time expands the composition to the opposite interior surface of the mold which thus provides a smooth continuous surface for the composition. During this treatment, the rubber or synthetic rubber polymer also becomes vulcanized or polymerized to an inert state. The final surface then is uniformly smooth over its entire area, eliminating all surface irregularities and protuberances such as rivet heads.

The following examples are given by way of illustration only and no limitations are intended thereby except as indicated in the appended claims.

Example 1

A fabric sheeting weighing about 4 square yards per pound was base coated with a conventional rubber cement, commonly consisting essentially of crepe rubber, rosin, reclaimed rubber and pitch dissolved or dispersed in gasoline or toluene. After the cement base coat had dried a modified rubber compound of the following composition was applied to the fabric at a thickness of 0.1 inch by calender application:

| | Parts by weight |
|---|---|
| Crepe rubber (50 Mooney plasticity) | 60 |
| Whiting | 25 |
| Zinc oxide | 3 |
| Petrolatum | 6 |
| Stearic acid | 5 |
| Sodium bicarbonate | 7 |
| Antioxidant (phenyl beta-naphthylamine) | 1 |
| Sulfur | 2 |
| Accelerator (mercapto benzothiozol) | 0.75 |
| Diphenyl guanidine | 0.15 |

The surface of the rubber layer opposite the fabric foundation was coated with a thin film of the rubber cement described above and allowed to dry. This sheet consisting of the rubber compound on a supporting fabric base was applied manually over the entire surface of an airplane tail fin which was previously carefully cleaned to remove all dirt and grease and coated with a thin film of rubber cement, with the rubber surface next to the adhesive coated metal fin surface taking care that the abutted edges of any cut-out sections of the composite sheeting were in close contact to insure complete continuity in the final surface covering. U. S. Royal rim cement was found to be particularly suited for use in joining the rubber compound to the metal fin surface.

The tail fin carrying the rubber coating in an intermediate stage, with the fabric support outermost was placed in a light weight metal conforming mold loosely fitting to the extent that an expansion of the rubber compound covering to about 0.25 inch was allowed. The mold was heated by steam to a temperature of 320° F. for a period of ½ hour. During this treatment the compound expanded to a thickness up to about 0.25 inch and assumed a sponge-like, porous structure caused by the evolution of gas within the rubber compound. At the same time the rubber was vulcanized to impart characteristic resilient properties to the rubber compound. The resulting covering had a uniformly continuous, smooth surface covering the irregularities in the metal fin surface, including rivet heads which are so largely responsible for the loss in operating efficiency of an airplane.

*Example 2*

A cotton sheeting weighing about 4 square yards per pound was base coated with a neoprene cement of the following composition:

| | Parts by weight |
|---|---|
| Neoprene | 60 |
| Pine tar | 2 |
| Wood rosin | 3 |
| Calcined magnesia | 6 |
| Sulfur | 1 |
| Zinc oxide | 6 |
| Whiting | 22 |

The above composition was dispersed in toluol and spread on the fabric with a conventional doctor knife so as to deposit 1 ounce per yard of solids after evaporating the solvent.

0.1 inch of the following composition was then applied by calender application to the cement coated side of the fabric:

| | Parts by weight |
|---|---|
| Neoprene | 50 |
| Hexamethylene ammonium hexamethylene dithiocarbamate | 1 |
| Calcined magnesia | 2 |
| Stearic acid | 4 |
| High naphthenic content mineral oil | 8 |
| Petrolatum | 1 |
| Carbon black | 0.5 |
| Benzothiazyl disulfide | 0.5 |
| Sodium bicarbonate | 4 |
| Zinc oxide | 3 |
| Whiting | 26 |

The surface of the wing was cleaned and painted with a thin film of a rubber cement consisting of a gasoline dispersion of rubber, rosin, reclaimed rubber and pitch and allowed to dry.

The above neoprene coated fabric was then applied manually over the entire surface of the cement coated wing, with the neoprene coated side of the fabric adjacent to the wing and the fabric constituting the outermost layer, taking care that the abutted edges of sections of the composite layer were in close contact to insure continuity in the final surface covering.

The wing carrying the superimposed composite sheet was then placed in a conforming mold loosely fitting to the extent that an expansion of the neoprene compound to 0.25 inch could take place.

The mold was then heated with steam to a temperature of 320° F. for one hour, during which time the neoprene compound expanded to a thickness of approximately 0.25 inch and assumed a sponge-like structure due to the evolution of gas within the compound. At the same time the compound was vulcanized or polymerized to a permanent resilient form.

The resultant product was characterized by a uniformly continuous smooth surface covering the irregularities in the wing surface, including the rivet heads.

Although in the example, heating of the rubber compound is accomplished by supplying steam to the interior of the mold, satisfactory results may also be secured by supplying steam directly to the interior of the wing or fin structure. Suitable electric heating means may also be employed if desired.

I have found that for practical operation of the present process in cases in which large surface areas are involved and in which these surfaces have a curving contour, the use of a fabric of equivalent fibrous, porous material is essential over the surface of the potentially sponging rubber or synthetic rubber polymer. This modification eliminates pits and indentation imperfections caused by entrapped air or gas by allowing it to escape from the mold cavity through the fabric and thus provide a more uniformly smooth surface for the wing or fin covering. The use of the fabric also prevents the sponge rubber from sticking to the mold and facilitates shipping and tailoring of the unvulcanized sponge rubber composition. It also provides a base for the application of surface coatings to which good adhesion can be obtained. Desirable surface coatings consist of durable, flexible materials which may contain cellulose derivatives, synthetic resins, oleoresinous compositions, synthetic or natural rubber polymers and which may be applied as a solution in volatile solvents or in the form of a latex, or similar materials. They should be preferably applied from solutions, the viscosity of which is such that on application the fine imperfections of the fabric are filled and the coating levels into a smooth surface but materials having another consistency and accomplishing the same result would be satisfactory. It is essential that this coating be resistant to extremes of atmospheric conditions. When exposed for long periods to temperatures as low as −25° F. or even −40° F., it should not become brittle or subject to fracture. On the other hand the coating must be resistant to sunlight and high temperatures as would be found in the tropics which may reach as much as 150° F. or more on the surface without displaying serious change of properties. The coating must also be resistant to rain, snow, and abrasion such as produced by ordinary impacts of tools or pebbles and by workmen walking on the wings. When synthetic or natural rubber polymers in the form of solutions in volatile liquids or latex are applied, they may be of the air curing type or of those which require the application of heat for vulcanization. In the latter case the entire wing may be placed in a full or sectional mold having a polished contact surface so that after vulcanization has taken place, the finished wing has a smooth glossy surface. If necessary, sticking to the mold may be prevented by any suitable means known in the art, such as by the use of dusting powder, mold solutions, etc.

According to the present invention, the unvulcanized natural or artificial sponge rubber compound may be applied directly to a suitable fabric by calendering. Usually the potentially spongy composition is secured to the fabric by means of a thin layer of rubber or neoprene cement which may be applied to the fabric before calendering thereon the sponge layer. After calendering, the coated fabric may be shipped and/or tailored to the wing or fin and the like with relative ease and with the result that after the composition is heated in the mold, a smooth uniform layer having a fabric surface is obtained, said layer being approximately ¼ inch in thickness.

Another modification comprises the substitution of or the addition to the fabric foundation of a thin skin film of non-spongy rubber, neoprene or other synthetic rubber polymer which may or may not be already vulcanized or polymerized as desired, previously coated with a rubber adhesive and dried, applied over the surface of unsponged rubber followed by "blowing" this assembly as previously described. This provides an unusually smooth surface and also effectively seals any pores which might be present as a result of the sponging treatment. The skin film is tightly adherent since it becomes vulcanized into the spongy base during the heat treatment. The skin film preferably consists of neoprene since this material affords grease and oil resistance and greater general durability on outdoor exposure. Thin metallic foil may also be employed in covering the sponge rubber or synthetic rubber polymer. A final top coat finish of conventional type as previously described may be applied if desired.

The hardness of the covering may be varied considerably to meet special requirements by varying the composition to control the degree and character of sponging, by varying the milling cycle of the crepe rubber used in preparing the composition and by confining the composition in a closer fitting mold during the heat treatment.

Instead of the rubber compound shown in Example 1, other rubber compounds of equivalent chemical and physical properties may be employed. Synthetic rubber polymer, for example, neoprene, such as described in U. S. Patent 1,950,431 and manufactured by E. I. du Pont de Nemours & Company, essentially a plastic polymer of 2 chloro-butadiene 1,3; Thiokol, an olefine polysulfide resin; Buna rubber, a synthetic polymer consisting essentially of butadiene; or other synthetic rubber polymer of equivalent properties are also satisfactory.

The coating may be applied over the entire wing or fin structure and over part or all of the aircraft fuselage if desired, although in some instances it may suffice to coat only the forepart of the wing, for example, the foremost one-third part of the wing where uniform smoothness to avoid air turbulence is most important.

The thickness of the coating indicated in the example is not strictly limitative since the thickness may be varied considerably to meet specific requirements. In any event, it is essential that the ultimate coating thickness be greater than any surface irregularity including protruding rivet heads. Excessive coating thickness should generally be avoided since no advantages accrue thereby and the unnecessarily increased weight contributes to counteract the improvements accomplished by the invention when it is properly practiced. A thickness of coating up to about 0.25 inch is ordinarily sufficient.

The requirements for adhesion of the coating to the metal wing or fin surfaces are norminal. It is estimated that there is a suction force on top of the airplane wing of seldom more than 4 pounds per square inch so that the adhesive strength of the bond between the metal surface of the wing and the coating compound need only be on that order. The ordinary rubber cements, however, such as that suggested in the examples afford joint strengths in excess of the requirement just noted so that acceptable adhesion between the metal surface of the wing or fin is readily obtained in operating the process of the invention. Light sand-blasting of the metal surfaces may also be employed in developing a good bond. Adhesion in some cases may also be improved by suitable pre-treatment of the metal wing or fin surface such as by plating the surface with nickel or copper or by known treatments with metallic salts.

While in the examples the porous spongy structure was developed in the rubber compound coating by the evolution of gas from reacting chemicals, similar results may be obtained by pumping a foamed rubber latex or synthetic rubber solution into a loosely fitting mold containing the wing or fin and applying heat to vulcanize the plastic in the presence of trapped air bubbles.

The primary advantage of the invention is the elimination or marked reduction in wing drag from turbulence in air flow over the wing surface heretofore encountered because of surface irregularities and protuberances such as rivet heads. This improvement affords significant advantages in performance and operating efficiency, particularly as regards speed increases of important magnitude and in fuel economy. The improved wing and fin structures do not add excessive weight to the airplane unit, a factor which is obviously important for either military or commercial aircraft. The wing or fin surface as afforded in the practice of the invention which is uniformly smooth over the entire surface area is also characterized by the ability of withstanding great temperature extremes which, in extreme cases, may range from —70° F. to 150° F. for the airplane in service. A further important advantage resides in the great resiliency and elasticity of the coating which withstands continued vibration and wing deformations amounting to deflections of as much as 2 feet up and 1 foot down sometimes encountered during flight. This property of great elasticity is of considerable benefit also because of the very great difference in the coefficient of expansion between the metal structure of the wing or fin and the coating since the adhesion strength between these entirely unrelated materials is not impaired as would be the case in coating compositions where high elasticity is lacking.

Conventional rubber coatings of non-spongy character applied to certain portions of airplane surfaces by orthodox methods have been employed for de-icing purposes, but such coatings and processes are in no sense to be considered the equivalent of the present invention. Coatings of this nature for the present purpose would involve intolerable excessive added weight and in order to mold them to the wing or fin surface to smooth out all surface irregularities, heavy and expensive molds and high pressures such as would distort the wing or fin structures would be required, thus rendering such systems incapable of attaining the aforementioned objectives.

It is apparent that many widely different embodiments of this invention may be made without departing from the spirit and scope thereof, and therefore, it is not intended to be limited except as indicated in the appended claims.

I claim:

1. The process of preparing airplane wings, fins and the like, having a pre-shaped metal body with protruding rivet heads which comprises applying to the said body a thin film of a rubber bonding cement, coating a finely woven, strong fabric sheeting with a rubber cement, allowing the same to dry and calendering thereon a layer of a composition containing a rubber adapted to form a sponge rubber on heating, the said layer being approximately 0.1 inch thick before heating, tailoring the said coated fabric over the said airplane part coated with the bonding cement, the sponge rubber layer being in contact with the cement on the said metal body, placing the coated airplane part in a mold slightly larger than the coated part, heating to cause the rubber to expand and fill the mold and having the rivet heads embedded therein without causing protuberances on the surface and thereafter applying a film of a flexible weather resistant material over the said fabric.

2. The process of claim 1 in which the sponge rubber layer has approximately the following composition:

| | Parts by weight |
|---|---|
| Crepe rubber (50 Mooney plasticity) | 60 |
| Whiting | 25 |
| Zinc oxide | 3 |
| Petrolatum | 6 |
| Stearic acid | 5 |
| Sodium bicarbonate | 7 |
| Anti-oxidant (phenyl beta-naphthylamine) | 1 |
| Sulfur | 2 |
| Accelerator (mercapto benzothiozol) | 0.75 |
| Diphenyl guanidine | 0.15 |

VAILE A. COSLER.